No. 745,471. PATENTED DEC. 1, 1903.
I. B. ABRAHAM.
PORTABLE DISAPPEARING FENCE.
APPLICATION FILED APR. 15, 1903.
NO MODEL.
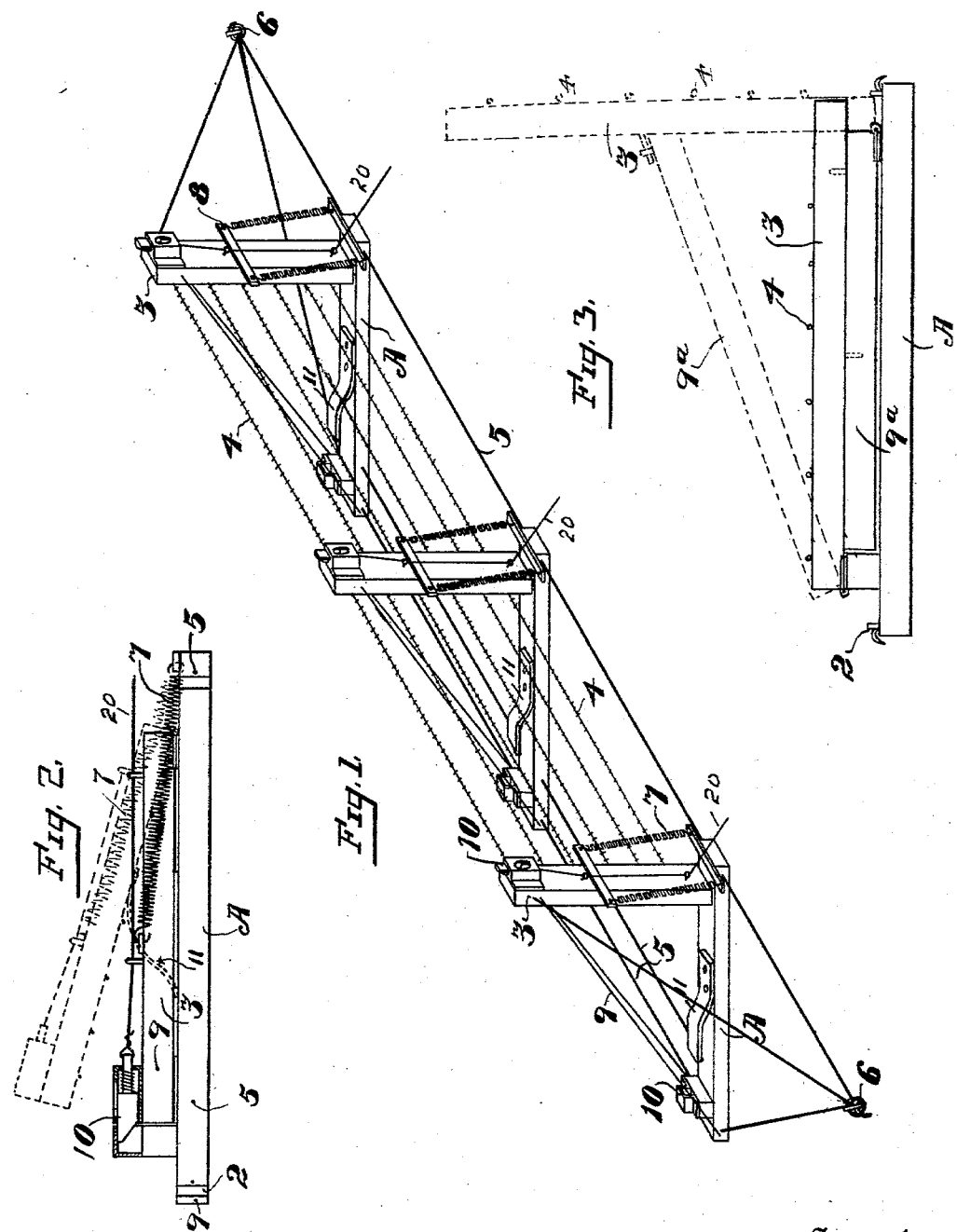
Witnesses,
Inventor,
Isaac B. Abraham
By Geo. H. Strong.

No. 745,471.

Patented December 1, 1903.

UNITED STATES PATENT OFFICE.

ISAAC B. ABRAHAM, OF SAN FRANCISCO, CALIFORNIA.

PORTABLE DISAPPEARING FENCE.

SPECIFICATION forming part of Letters Patent No. 745,471, dated December 1, 1903.

Application filed April 15, 1903. Serial No. 152,677. (No model.)

*To all whom it may concern:*

Be it known that I, ISAAC B. ABRAHAM, a citizen of the United States, residing in the city and county of San Francisco, State of California, have invented an Improvement in Portable Disappearing Fences; and I hereby declare the following to be a full, clear, and exact description of the same.

My invention relates to a novel construction of fences which is especially designed for use in times of war to obstruct the movements of bodies of troops, but it may also be used in conjunction with fences designed for temporary herding of cattle.

It consists of posts each hinged to a horizontal base, which bases are adapted to be fixed to the ground, connecting-wires by which the intervals between the bases may be maintained, and barbed or other wire stringers extending between the hinged posts. These posts have connected with one side springs which are adapted to raise them into a vertical position when released and upon the opposite side flexible wires or wire ropes connected with the extended bottom pieces to act as stays and prevent the springs from carrying the post beyond the vertical position. In conjunction with these are latches by which the posts and bases or sills are normally connected together when the posts are lying flat, and the whole structure can be rolled up for transportation and unrolled upon the ground at any point where used. Means are provided for simultaneously disengaging the latches, so as to allow the springs to act.

My invention also comprises details of construction, which will be more fully explained by reference to the accompanying drawings, in which—

Figure 1 is a section of my fence in perspective. Fig. 2 is an enlarged detail of post and base, dotted lines showing post partially raised. Fig. 3 is an enlarged detail of modification, dotted lines showing post and brace in raised position.

As shown in the drawings, A represents bases or sills of suitable length adapted to lie upon the ground and having means by which they can be secured. These means may consist of holes made through the sills, if the latter are made of wood, or if they are made in the form of iron rods eyes may be formed in the ends of these rods for the reception of pins, as at 2, which are driven down, and thus hold the sills firmly in place.

3 represents posts, the lower ends of which are hinged to the sills at some point between the ends, and the posts may be folded down about the hinges so as to lie flat upon the sills. Barbed or other wires 4 are secured to the posts, so that when the latter are set up they form a complete fence.

When laid upon the ground, the structure may be rolled up in suitable lengths convenient for transportation.

The bases or sills which lie upon the ground are connected together with wire or flexible wire ropes, as at 5, and these form a gage to regulate the distance between the sills when the device is unrolled and to keep the latter in proper position with relation to the posts. These wires may extend beyond the ends of the structure and have rings or eyes, as at 6, into which pins can be driven to hold each length of the structure in position.

7 represents spiral or other equivalent springs, which are here shown with one end connected with each post, as at 8, and the opposite end extending down to the part of the sills which projects on that side beyond the hinge of the post.

9 represents flexible wires or wire ropes connected with the opposite sides of the posts and extending to the opposite ends of the sills, so that when the posts are set up vertically these guy-ropes prevent their being pulled too far over by the action of the springs, and the tension of the springs would be sufficient to hold the posts in position.

When the posts are folded down upon the sills, they may be held in position by latches of any suitable character, as at 10, and when the lengths of fence have been stretched upon the ground they will be imperceptible to persons at a short distance away. These are the conditions under which such fences would be used in war, and if a body of cavalry or other troops should make a charge it would only be necessary for concealed operators to pull upon a cord or cords 20, connecting with the latches and passing through appropriate guides and leading to any desired distant point, so that when pulled upon the cords pull upon the latches to disengage them, and thus allow the springs 7, supplemented by appropriate auxiliary springs 11, located between the posts and the sills for initially starting the posts into their upright position, to act and instantaneously set the fence up, and any desired length of fence could thus be set up and with the barbed wires connecting the posts would form such an obstruction as to throw the charging body into confusion and hold them in position for destruction by the concealed body of their enemy. When used for other purposes, the fence-sections may be rapidly set up to form an inclosure into which animals may be placed for grazing or for temporary retention. When used for such purpose, the springs for raising the posts may be omitted and the posts may be raised by hand, and in place of the springs and bracing-wires rigid braces 9ª may be hinged to the sills in opposition to the posts. These braces are preferably exterior to the line of posts, so that inclosed animals cannot touch them. The springs 11 may be so disposed as to partially raise the posts as soon as the latches are disengaged and lift them to such an angle that the springs 7 can act and complete the movement.

Having thus described my invention, what I claim, and desire to secure by Letters Patent, is—

1. The combination in a fence, of ground supports; posts having connecting-wires and means pivoting the lower ends of the posts to the supports; mechanism for holding the posts in a depressed position; means for releasing the holding mechanism; means for imparting an initial movement to the posts when the holding mechanism is released; and means for completing the movement of the posts and elevating them into substantially an upright position.

2. A portable disappearing fence including ground supports and posts pivoted together at their meeting portions; wires extending between the posts, said posts and supports and wires capable of being rolled together; mechanism for holding the posts upon and substantially parallel with the supports; mechanism for releasing the holding mechanism; and means including main and auxiliary springs for elevating the posts and connecting-wires, substantially as described.

3. The combination in a fence of posts having wires secured thereto, sills with means for securing them upon the ground, hinges by which the lower ends of the posts are pivotally connected with the sills, springs between the posts and the sills to raise the posts from a horizontal to a vertical position and flexible wire connections by which the movement of the posts is limited.

4. The combination in a fence of posts having wires extending between them, sills and means by which they may be secured to the ground, hinges about which the posts are foldable upon the sills, springs connecting one side of the posts with the sills and other springs between the posts and sills whereby said posts may be raised into a vertical position, flexible connections to limit the movement of the posts, and disengaging latches by which the posts are normally retained in their folded position upon the sills so that the structure may be rolled together.

5. The combination in a fence of posts having wires extending between them, sills to which the bottoms of the posts are hinged, gage connections extending between the sills to fix the distance and position of said sills when stretched upon the ground, means for securing the outer ends of these connections, latches by which the posts are normally retained lying upon the sills, means for disengaging said latches, and main and auxiliary springs between the posts and sills whereby said posts are erected upon the sills, and stops by which the posts are held in position when so erected.

6. The combination in a fence of ground supports; posts hinged thereto and foldable thereon; engaging means for holding the posts in their folded position; main and auxiliary springs between the posts and supports and exerting a lifting power upon the posts; mechanism for releasing the holding means to allow the springs to act; wires extending between the posts; and means limiting the forward movement of the posts.

7. A portable disappearing fence including posts and ground supports pivoted together and wires extending between the posts, said posts and supports and wires capable of being wound together and said posts capable of movement from a horizontal to substantially an upright position; spacing devices between the supports; and braces extending between the posts and the supports.

In witness whereof I have hereunto set my hand.

ISAAC B. ABRAHAM.

Witnesses:
S. H. NOURSE,
JESSIE C. BRODIE.